US012675430B2

(12) United States Patent (10) Patent No.: US 12,675,430 B2
Oh (45) Date of Patent: Jul. 7, 2026

(54) BATTERY MANAGEMENT APPARATUS AND OPERATING METHOD THEREOF

(71) Applicant: LG ENERGY SOLUTION, LTD., Seoul (KR)

(72) Inventor: Young Kyu Oh, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/832,263

(22) PCT Filed: Jan. 6, 2023

(86) PCT No.: PCT/KR2023/000325
§ 371 (c)(1),
(2) Date: Jul. 23, 2024

(87) PCT Pub. No.: WO2023/146156
PCT Pub. Date: Aug. 3, 2023

(65) Prior Publication Data
US 2025/0103541 A1 Mar. 27, 2025

(30) Foreign Application Priority Data
Jan. 26, 2022 (KR) ........................ 10-2022-0011604

(51) Int. Cl.
*G06F 13/42* (2006.01)
*G06F 13/40* (2006.01)
*H04L 12/40* (2006.01)

(52) U.S. Cl.
CPC ...... *G06F 13/4282* (2013.01); *G06F 13/4068* (2013.01); *H04L 12/40169* (2013.01);
(Continued)

(58) Field of Classification Search
None
See application file for complete search history.

(56) References Cited

U.S. PATENT DOCUMENTS 10,095,650 B2 * 10/2018 Williams ............ G06F 13/4265
10,320,034 B2 * 6/2019 Hallmark ............ H01M 50/505
(Continued)

FOREIGN PATENT DOCUMENTS

CN 103678779 A 3/2014
CN 112866018 A 5/2021
(Continued)

OTHER PUBLICATIONS

'Communication Protocol - Reference Manual' from Nuvation Energy, 2020. (Year: 2020).*
(Continued)

*Primary Examiner* — Steven G Snyder
(74) *Attorney, Agent, or Firm* — Birch, Stewart, Kolasch & Birch, LLP

(57) ABSTRACT

A battery management apparatus according to an embodiment disclosed herein includes a microcontroller unit (MCU) for identifying whether a Modbus-communication connector is connected, identifying whether a controller area network (CAN)-communication connector is connected, and configuring a communication protocol based on identification results of the first identifying unit and the second identifying unit.

14 Claims, 4 Drawing Sheets

(52) U.S. Cl.
CPC ................ *G06F 2213/0012* (2013.01); *H04L 2012/40215* (2013.01); *H04L 2012/40228* (2013.01)

(56) References Cited

U.S. PATENT DOCUMENTS

| | | | |
|---|---|---|---|
| 10,938,221 B1 | 3/2021 | Tenorio | |
| 10,944,278 B1 | 3/2021 | Kang et al. | |
| 10,944,279 B1 | 3/2021 | Chen et al. | |
| 11,095,140 B1 | 8/2021 | Chen et al. | |
| 11,133,690 B1 | 9/2021 | Chen et al. | |
| 11,394,231 B2 * | 7/2022 | Moorman | H02J 7/34 |
| 11,594,892 B2 * | 2/2023 | Liu | H02J 7/007 |
| 11,929,636 B2 * | 3/2024 | Moorman | H02J 7/0068 |
| 2007/0214288 A1 | 9/2007 | Wehrle et al. | |
| 2012/0327939 A1 | 12/2012 | Jang | |
| 2015/0074190 A1 | 3/2015 | Nelson et al. | |
| 2015/0214758 A1 | 7/2015 | Toya et al. | |
| 2017/0286351 A1 * | 10/2017 | Williams | H04L 67/104 |
| 2018/0048619 A1 | 2/2018 | Maluf et al. | |
| 2018/0254651 A1 * | 9/2018 | Hallmark | H02J 7/0013 |
| 2020/0152940 A1 * | 5/2020 | Butterfield | H01M 50/204 |
| 2020/0251910 A1 * | 8/2020 | Moorman | H02J 7/34 |
| 2020/0280460 A1 | 9/2020 | Fujita et al. | |
| 2021/0376629 A1 | 12/2021 | Chen et al. | |
| 2021/0390868 A1 * | 12/2021 | Ratajczak | G05D 1/104 |
| 2022/0232110 A1 | 7/2022 | Choi | |
| 2022/0239119 A1 * | 7/2022 | Liu | H01M 10/482 |
| 2022/0294239 A1 * | 9/2022 | Liu | H02J 7/00036 |
| 2022/0311266 A1 * | 9/2022 | Moorman | H02J 7/34 |
| 2023/0178997 A1 * | 6/2023 | Tenorio | H02J 7/00036 320/112 |
| 2023/0387696 A1 | 11/2023 | Liu et al. | |

FOREIGN PATENT DOCUMENTS

| | | | | |
|---|---|---|---|---|
| CN | 214014250 U | 8/2021 | | |
| EP | 1372081 A2 * | 12/2003 | ......... | G06F 13/387 |
| JP | 2001-86187 A | 3/2001 | | |
| JP | 2016-539586 A | 12/2016 | | |
| JP | 6103392 B2 | 3/2017 | | |
| JP | 2020-141282 A | 9/2020 | | |
| KR | 10-1191547 B1 | 10/2012 | | |
| KR | 10-1516414 B1 | 5/2015 | | |
| KR | 10-1561885 B1 | 10/2015 | | |
| KR | 10-2018-0049734 A | 5/2018 | | |
| KR | 10-2020-0053850 A | 5/2020 | | |
| KR | 10-2021-0108816 A | 3/2021 | | |
| WO | WO-2021044145 A1 * | 3/2021 | ............... | H02J 7/80 |
| WO | WO 2021/172790 A1 | 9/2021 | | |

OTHER PUBLICATIONS

'Communication Platform for Energy Management System in a Master-slave Control Structure Microgrid' by Zhu et al., 2012 IEEE 7th International Power Electronics and Motion Control Conference. (Year: 2012).*

Machine translation of Chinese Patent Application CN 116192598 A, published 2023. (Year: 2023).*

Machine translation of German Patent Application DE 102022102143 A1, published 2023. (Year: 2023).*

Machine translation of Chinese Patent Application CN 117527762 A, published 2024. (Year: 2024).*

Machine translation of Chinese Patent Application CN 102325201 A, published 2012. (Year: 2012).*

Huculak, 'How to change the priority order of network adapters on Windows 10', published Jun. 19, 2018. (Year: 2018).*

'Changing network adapter priority in Windows' from Northwestern. edu, updated 2019. (Year: 2019).*

Extended European Search Report for European Application No. 23747199.0, dated Mar. 11, 2025.

International Search Report (PCT/ISA/210) issued in PCT/KR2023/000325, dated Apr. 7, 2023.

* cited by examiner

BATTERY MANAGEMENT APPARATUS AND OPERATING METHOD THEREOF

TECHNICAL FIELD

CROSS-REFERENCE TO RELATED APPLICATION

This application claims priority to and the benefit of Korean Patent Application No. 10-2022-0011604 filed in the Korean Intellectual Property Office on Jan. 26, 2022, the entire contents of which are incorporated herein by reference.

TECHNICAL FIELD

Embodiments disclosed herein relate to a battery management apparatus and an operating method thereof.

Background Art

Recently, as the demand for portable electronic products such as laptop computers, video cameras, and mobile phones has increased rapidly, and development of electric vehicles, batteries for energy storage, robots, satellites, etc., has hit its stride, research on high-performance batteries that are repeatedly chargeable and dischargeable is being actively conducted.

Current commercially available batteries include nickel cadmium batteries, nickel hydride batteries, nickel zinc batteries, lithium batteries, and so forth, among which the lithium batteries are in the limelight due to their advantages of free charge and discharge due to little memory effect, very low self-discharge rate, and high energy density, compared to nickel-based batteries.

In general, to optimally manage such a battery, a battery management system (BMS) is provided in a battery pack. The battery management system may diagnose the state of the battery by monitoring the voltage and current, etc. of the battery. For example, the battery management system may diagnose whether the battery is in an overcharge or over-discharge state. In addition, the battery management system may perform balancing among a plurality of batteries and may control the operating state of relays included in the battery pack.

The battery management system may communicate using a controller area network (CAN) communication protocol and/or a Modbus communication protocol, and transmit battery state information and battery diagnosis information (e.g., error information) to a monitoring device. The battery management system may use both Modbus-transmission control protocol (TCP) communication through an Ethernet port and CAN communication through a CAN port.

DISCLOSURE

Technical Problem

When a battery management system uses both Modbus-transmission control protocol (TCP) communication through an Ethernet port and controller area network (CAN) communication through a CAN port, it is necessary to determine through which channel communication is to be performed. Generally, the battery management system may allocate an identifier (ID) through CAN communication by using a daisy chain, but may allocate an ID through Modbus-TCP communication when CAN communication is impossible. When the battery management system allocates an ID through Modbus-TCP communication, it may not be able to allocate the ID through a wake-up signal that is a feature of the daisy chain, needing to explicitly input configuration information to perform Modbus-TCP communication to a flash memory. However, direct input of configuration information to perform Modbus-TCP communication may cause a human-error, and thus it is necessary to automatically set a communication protocol configuration method and/or an ID allocation method depending on whether a connector is connected to a CAN port or to an Ethernet port.

Technical Solution

A battery management apparatus according to an embodiment disclosed herein includes a micro controller unit (MCU) configured to identify whether a Modbus-communication connector is connected in a first identifying step, identify whether a controller area network (CAN)-communication connector is connected in a second identifying step, and configure a communication protocol based on identification results of the first identifying step and the second identifying step.

According to an embodiment, the MCU may be configured to configure a Modbus-communication protocol when it is determined that the Modbus-communication connector is connected.

According to an embodiment, the MCU may be configured to configure a CAN-communication protocol when it is determined that the CAN-communication connector is connected.

According to an embodiment, when the MCU determines that the CAN-communication connector is connected, an identifier (ID) may be allocated in a daisy chain through CAN communication.

According to an embodiment, when the MCU determines that the CAN-communication connector is not connected, the ID may be allocated through Modbus-transmission control protocol (TCP).

An operating method of a battery management apparatus according to an embodiment disclosed herein includes a first identifying operation of identifying whether a Modbus-communication connector is connected, a second identifying operation of identifying whether a CAN-communication connector is connected, and configuring a communication protocol based on identification results of the first identifying operation and the second identifying operation.

According to an embodiment, the operating method may further include configuring a Modbus-communication protocol when the first identifying operation identifies that the Modbus-communication connector is connected.

According to an embodiment, the operating method may further include configuring a CAN-communication protocol when the second identifying operation identifies that the CAN-communication connector is connected.

According to an embodiment, the operating method may further include being allocated with an identifier (ID) in a daisy chain through CAN communication when the second identifying operation identifies that the CAN-communication connector is connected.

According to an embodiment, the operating method may further include being allocated with the ID through Modbus-transmission control protocol (TCP) when the second identifying operation identifies that the CAN-communication connector is not connected.

Advantageous Effects

A battery management apparatus according to the disclosure may identify whether a controller area network (CAN)- communication connector is engaged and a Modbus-communication connector is engaged, and automatically configure a communication protocol according to an identification result, thereby preventing human error.

The battery management apparatus according to the disclosure may easily manage a battery by automating an operation of the battery management apparatus along a communication path of a physically connected connector without a separate configuration.

The effects of the battery movement detection apparatus and the battery monitoring system according to the disclosure of the present document are not limited to the effects mentioned above, and other effects not mentioned will be clearly understood by those of ordinary skill in the art according to the disclosure of the present document.

DESCRIPTION OF DRAWINGS

With regard to the description of the drawings, similar reference numerals may be used to refer to similar or related components.

MODE FOR INVENTION

Figure 1:
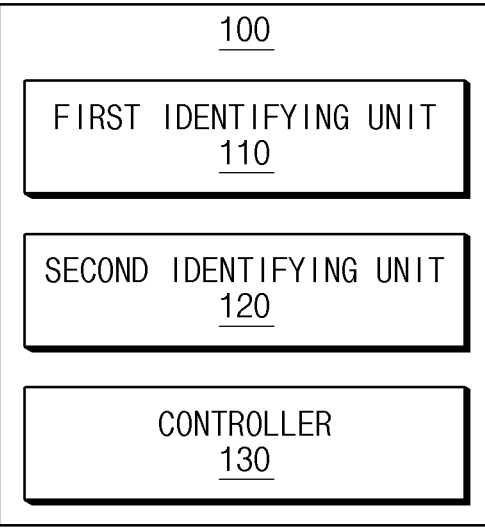
FIG. 1 is a diagram of a battery management apparatus according to an embodiment disclosed herein.

Hereinafter, various embodiments of the present disclosure will be disclosed with reference to the accompanying drawings. However, the description is not intended to limit the present disclosure to particular embodiments, and it should be construed as including various modifications, equivalents, and/or alternatives according to the embodiments of the present disclosure.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Such terms as "1$^{st}$", "2$^{nd}$," "first", "second", "A", "B", "(a)", or "(b)" may be used to simply distinguish a corresponding component from another, and does not limit the components in other aspect (e.g., importance or order), unless mentioned otherwise.

Herein, it is to be understood that when an element (e.g., a first element) is referred to, with or without the term "operatively" or "communicatively", as "connected with", "coupled with", or "linked with", or "coupled to" or "connected to" to another element (e.g., a second element), it means that the element may be connected with the other element directly (e.g., wiredly), wirelessly, or via a third element.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store, or between two user devices directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a diagram of a battery management apparatus according to an embodiment disclosed herein.

Referring to FIG. 1, a battery management apparatus 100 may include a first identifying unit 110, a second identifying unit 120, and a controller 130.

The first identifying unit 110 may identify whether a Modbus-communication connector is connected. The first identifying unit 110 may include one of a plurality of pins included in an Ethernet port. The first identifying unit 110 may identify whether the Modbus-communication connector is connected, based on whether normal power supplied to the Ethernet port is detected. According to an embodiment, the first identifying unit 110 may identify that the Modbus-communication connector is connected, when detecting the normal power in the Ethernet port.

The second identifying unit 120 may identify whether a controller area network (CAN)-communication connector is connected. The second identifying unit 120 may include one of a plurality of pins included in a CAN port. The second identifying unit 120 may identify whether the CAN-communication connector is connected, based on whether normal power supplied to the CAN port is detected. According to an embodiment, the second identifying unit 120 may identify that the CAN-communication connector is connected, when detecting the normal power in the CAN port.

The controller 130 (e.g., hardware embedded processor) may configure a communication protocol of the battery management apparatus 100. The controller 130 may configure a communication protocol based on identification results of the first identifying unit 110 and the second identifying unit 120.

According to an embodiment, when the first identifying unit 110 identifies that the Modbus-communication connector is connected, the controller 130 may configure a Modbus-communication protocol for the battery management apparatus 100. According to another embodiment, when the second identifying unit 120 identifies that the CAN-communication connector is connected, the controller 130 may configure a CAN-communication protocol for the battery management apparatus 100.

According to an embodiment, when each of the first identifying unit 110 and the second identifying unit 120 identifies that both the Modbus-communication connector and the CAN-communication connector are connected, the controller 130 may select one of the Modbus-communication protocol and the CAN-communication protocol at random to configure the selected one as a communication protocol of the battery management apparatus 100. According to another embodiment, when each of the first identifying unit 110 and the second identifying unit 120 identifies that both the Modbus-communication connector and the CAN-communication connector are connected, the controller 130 may preferentially configure the CAN-communication protocol as a communication protocol of the battery management apparatus 100.

The controller 130 may allocate an identifier (ID) of the battery management apparatus 100 through CAN communication or Modbus-TCP communication. The controller 130 may include a memory for storing data or a program required for configuring the communication protocol of the battery management apparatus 100 or performing CAN communication and/or Modbus-TCP communication.

According to an embodiment, when the second identifying unit 120 determines that the CAN-communication connector is connected, the controller 130 may allocate an ID of the battery management apparatus 100 connected in a daisy chain through CAN communication. In this case, the controller 130 may allocate the ID of the battery management apparatus 100 when the battery management apparatus 100 receives a wake-up signal through CAN communication. A method for the controller 130 to allocate the ID of the battery management apparatus 100 through CAN communication is not specially limited as long as the method is a well-known ID allocation method known as a method of allocating the ID of battery management apparatus 100 connected in a daisy chain through a wake-up signal.

According to another embodiment, when the second identifying unit 120 determines that the CAN-communication connector is not connected, the controller 130 may allocate the ID of the battery management apparatus 100 through Modbus-transmission control protocol (TCP). The controller 130 may allocate the ID according to prestored command logic when the controller 130 allocates the ID of the battery management apparatus 100 through Modbus-TCP. A method for the controller 130 to allocate the ID of the battery management apparatus 100 through Modbus-TCP communication may not be specially limited as long as the method is an ID allocation method under Modbus communication. However, when each of the first identifying unit 110 and the second identifying unit 120 determines that either the Modbus-communication connector or the CAN-communication connector is not connected, the controller 130 may maintain the battery management apparatus 100 in a communication standby state. Alternatively, each of the first identifying unit 110, the second identifying unit 120, and the controller 130 of the battery management apparatus 100 can be configured as a hardware-embedded processor, such that the processes described above with respect to the first identifying unit 110, the second identifying unit 120, and the controller 130 can be performed by the hardware-embedded processor.

Figure 2:
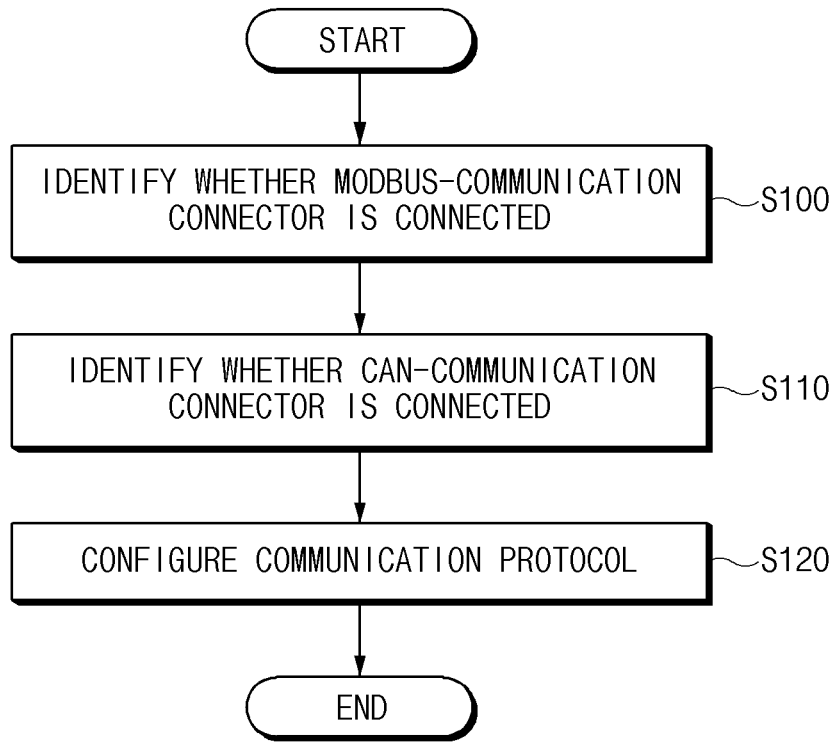
FIG. 2 is a view showing an operating method of a battery management apparatus according to an embodiment disclosed herein.

FIG. 2 is a view showing an operating method of a battery management apparatus according to an embodiment disclosed herein.

Referring to FIG. 2, the operating method of the battery management apparatus may include operation S100 of identifying whether a Modbus-communication connector is connected, operation S110 of identifying whether a CAN-communication connector is connected, and operation S120 of configuring a communication protocol.

The operating method of the battery management structure may refer to FIG. 1. Hereinbelow, for convenience of description, a matter redundant to the foregoing matter described for convenience of a description will be briefly described or omitted.

In operation S100, the battery management apparatus 100 may identify whether the Modbus-communication connector is connected. The battery management apparatus 100 may identify whether the Modbus-communication connector is connected, based on whether normal power supplied to the Ethernet port is detected. The battery management apparatus 100 may use one of a plurality of pins connected to the Ethernet port as a terminal for identifying whether the Modbus-communication connector is connected. According to an embodiment, operation S100 in which the battery management apparatus 100 determines whether the Modbus-communication connector is connected may be referred to as a first identifying operation. According to an embodiment, operation S100 may be performed by the first identifying unit 110 of the battery management apparatus 100.

In operation S110, the battery management apparatus 100 may identify whether the CAN-communication connector is connected. The battery management apparatus 100 may identify whether the Modbus-communication connector is connected, based on whether normal power supplied to the CAN port is detected. The battery management apparatus 100 may use one of a plurality of pins connected to the CAN port as a terminal for identifying whether the CAN-communication connector is connected. According to an embodiment, operation S110 in which the battery management apparatus 100 determines whether the CAN-communication connector is connected may be referred to as a second identifying operation. According to an embodiment, operation S110 may be performed by the second identifying unit 120 of the battery management apparatus 100.

According to an embodiment, operations S100 and S110 may be performed at the same time (e.g., simultaneously) or in any order.

In operation S120, the battery management apparatus 100 may configure a communication protocol. The battery management apparatus 100 may configure the communication protocol based on an identification result of operation S100 and/or operation S110. The battery management apparatus 100 may configure the CAN-communication protocol when identifying that the CAN-communication connector is connected in operation S110. The battery management apparatus 100 may configure the Modbus-communication protocol when identifying that the Modbus-communication connector is connected in operation S100. Operation S120 may be performed by the controller 130 of the battery management apparatus 100.

According to an embodiment, the battery management apparatus 100 may select and configure the CAN-communication protocol or the Modbus-communication protocol when identifying that both the CAN-communication connector and the Modbus-communication connector are connected.

According to another embodiment, the battery management apparatus 100 may configure the CAN-communication protocol preferentially over the Modbus-communication protocol when identifying that both the CAN-communication connector and the Modbus-communication connector are connected.

According to an embodiment, operation S120 may include an operation in which the battery management apparatus 100 is allocated with the ID. The operation in which the battery management apparatus 100 is allocated with the ID will be described in detail with reference to FIG. 3.

Figure 3:
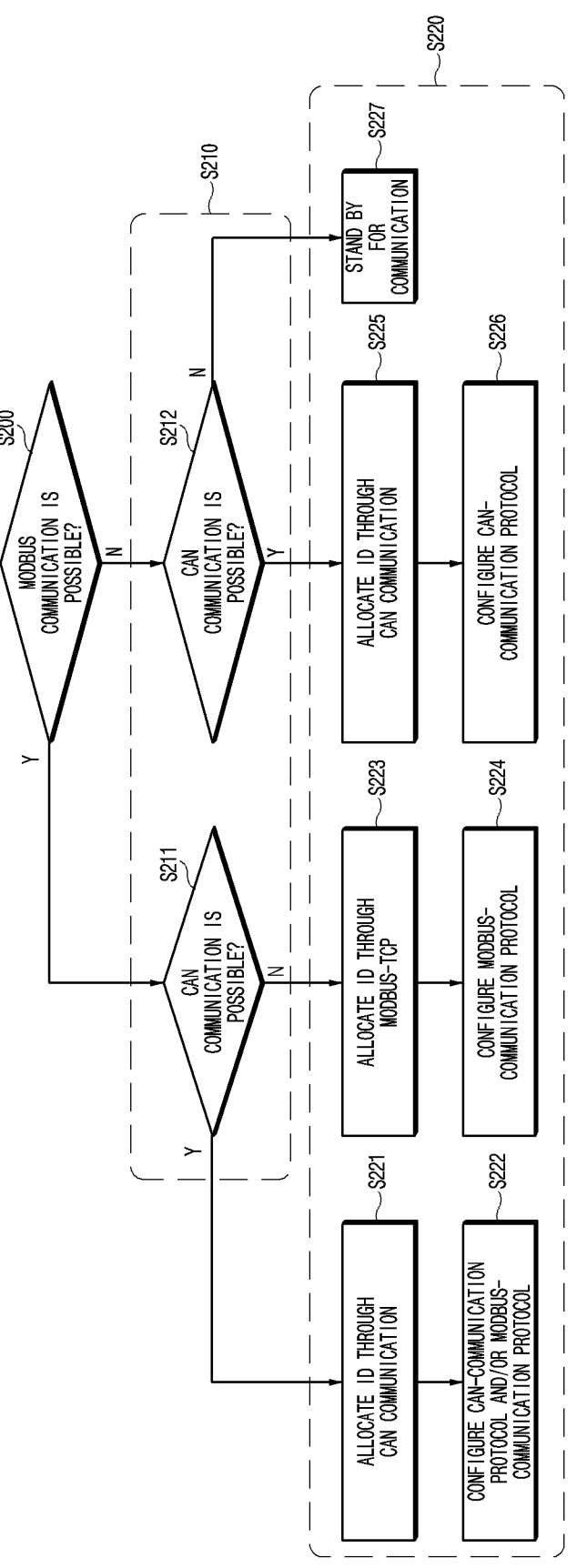
FIG. 3 is a view showing in detail an operating method of a battery management apparatus, according to an embodiment disclosed herein.

FIG. 3 is a view showing in detail an operating method of a battery management apparatus, according to an embodiment disclosed herein.

Referring to FIG. 3, the operating method of the battery management apparatus may include operation S200 of identifying whether Modbus-communication is possible, operation S210 of identifying whether CAN communication is possible, and operation S220 of allocating the ID of the battery management apparatus 100 and configuring a communication protocol of the battery management apparatus 100.

The operating method of the battery management apparatus will be described in more detail with reference to FIGS. 1 and 2. Hereinbelow, for convenience of description, a matter redundant to the foregoing matter described for convenience of a description will be briefly described or omitted.

In operation S200, the battery management apparatus 100 may identify whether Modbus communication is possible. Operation S200 may be substantially the same as operation S100 of FIG. 2. Operation S200 may be performed by the first identifying unit 110 of the battery management apparatus 100.

In operation S210, the battery management apparatus 100 may identify whether CAN communication is possible. Operation S210 may be substantially the same as operation S110 of FIG. 2. Operation S210 may be performed by the second identifying unit 120 of the battery management apparatus 100.

Operations S211 and S212 may be detailed embodiments of operation S210. The battery management apparatus 100 may identify whether CAN communication of the battery management apparatus 100 is possible in operation S211, or identify whether CAN communication of the battery management apparatus 100 is possible in operation S212 when Modbus communication is not possible.

According to an embodiment, operations S200 and S210 may be performed at the same time (simultaneously) or in any order. According to an embodiment, the battery management apparatus 100 may perform operation S210 before operation S200. When operation S210 is performed before operation S200 according to an embodiment, operation S200 may be embodied into an operation of identifying whether Modbus communication of the battery management apparatus 100 is possible when CAN communication is possible and an operation of identifying whether Modbus communication of the battery management apparatus 100 is possible when CAN communication is not possible.

In operation S220, the battery management apparatus 100 may allocate an ID or configure a communication protocol. Operation S220 may be substantially the same as operation S120 of FIG. 2. The battery management apparatus 100 may perform operation S220 based on identification results of operation S200 and operation S210.

In operation S220, the battery management apparatus 100 may include operation S221, S223, or S225 of allocating an ID of the battery management apparatus 100 through CAN communication or Modbus-TCP.

In operation S221, the battery management apparatus 100 may allocate the ID of the battery management apparatus 100 through CAN communication when identifying that Modbus communication and CAN communication are possible in operations S200 and S211. In operation S222, the battery management apparatus 100 allocated with the ID in operation S221 may configure a CAN-communication protocol and/or a Modbus-communication protocol. According to an embodiment, in operation S222, the battery management apparatus 100 may configure the CAN communication protocol preferentially over the Modbus-communication protocol or select the CAN-communication and the Modbus-communication protocol at random and configure the selected one. The battery management apparatus 100 may communicate with another electronic device through a communication protocol configured in operation S222. According to an embodiment, the other electronic device may include an external battery management apparatus.

In operation S223, the battery management apparatus 100 may allocate the ID through Modbus-TCP when identifying that Modbus communication is possible, but CAN communication is not possible in operations S200 and S211. In operation S224, the battery management apparatus 100 allocated with the ID in operation S223 may configure the Modbus-communication protocol. In this case, the battery management apparatus 100 may communicate with the other electronic device (e.g., the external battery management apparatus, etc.) through the Modbus-communication protocol.

In operation S225, the battery management apparatus 100 may allocate the ID through CAN communication when identifying that CAN communication is possible, but Modbus communication is not possible in operations S200 and S212. In operation S226, the battery management apparatus 100 allocated with the ID in operation S225 may configure the CAN-communication protocol. In this case, the battery management apparatus 100 may communicate with the other electronic device (e.g., the external battery management apparatus, etc.) through the CAN-communication protocol.

In operation S227, the battery management apparatus 100 may maintain a communication standby state when identifying that either Modbus communication or CAN communication is not possible in operations S200 and S212. According to an embodiment, the battery management apparatus 100 in the communication standby state may identify whether Modbus communication is possible and/or whether CAN communication is possible, in real time or in every preset periods, and repeatedly perform operation S200, operation S210, and/or operation S220.

According to an embodiment disclosed herein, when the battery management apparatus 100 allocates an ID through CAN communication in operations S221 and S225, the battery management apparatus 100 may use a well-known ID allocation method known as a method of allocating the ID of the battery management apparatus 100 connected in a daisy chain through a wake-up signal, and the method is not specially limited.

According to another embodiment, when the battery management apparatus 100 allocates the ID through Modbus-TCP in operation S223, the battery management apparatus 100 may allocate the ID according to a pre-stored command logic, and as long as the ID allocation method is one under Modbus communication, a type thereof is not specially limited.

Figure 4:
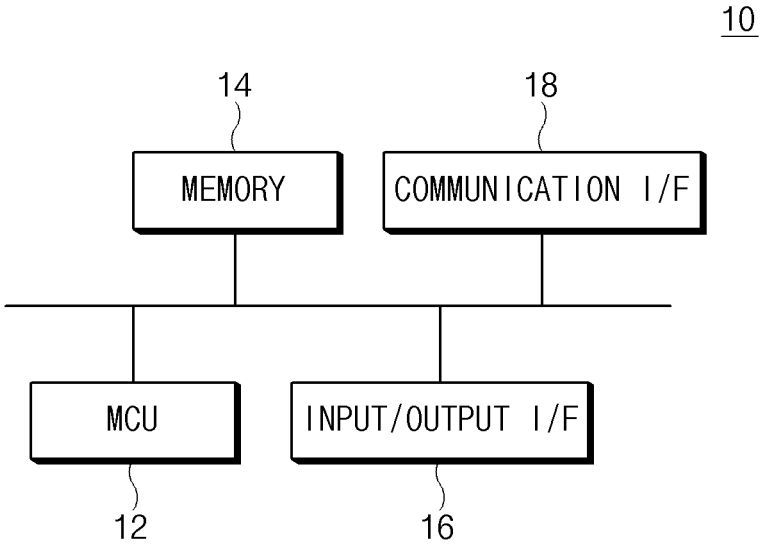
FIG. 4 is a diagram simply showing a battery management apparatus including a memory module, according to an embodiment disclosed herein.

FIG. 4 is a diagram simply showing a battery management apparatus including a memory module, according to an embodiment disclosed herein.

Referring to FIG. 4, a computing system 10 according to an embodiment disclosed herein may include a microcontroller unit (MCU) 12, a memory 14, an input/output interface (I/F) 16, and a communication interface (I/F) 18.

The MCU 12 may be a processor (e.g., hardware embedded processor) that executes various programs (e.g., a feature calculation program, a class classification and lifespan estimation program, etc.) stored in the memory 14, processes various data including voltage, current, etc., of a battery cell through these programs, and executes the above-described functions of the battery management apparatus shown in FIGS. 1 to 3.

The memory 14 may store various programs regarding feature calculation, class classification, and lifespan estimation of the battery cell. Moreover, the memory 14 may store various data such as a voltage, a current, feature data, etc., of each battery cell.

The memory 14 may be provided in plural, depending on a need. The memory 14 may be volatile memory or non-volatile memory. For the memory 14 as the volatile memory, random access memory (RAM), dynamic RAM (DRAM), static RAM (SRAM), etc., may be used. For the memory 14 as the nonvolatile memory, read only memory (ROM), programmable ROM (PROM), electrically alterable ROM (EAROM), erasable PROM (EPROM), electrically erasable PROM (EEPROM), flash memory, etc., may be used. The above-listed examples of the memory 14 are merely examples and are not limited thereto.

The input/output I/F 16 may provide an interface for transmitting and receiving data by connecting an input device (not shown) such as a keyboard, a mouse, a touch panel, etc., and an output device such as a display (not shown), etc., to the MCU 12.

The communication I/F 18, which is a component capable of transmitting and receiving various data to and from a server, may be various devices capable of supporting wired or wireless communication. For example, a program for feature calculation, class classification, and lifespan estimation for a battery cell or various data, etc., may be transmitted and received to and from a separately provided external server through the communication I/F 18.

As such, a computer program according to an embodiment disclosed herein may be recorded in the memory 14 and processed by the MCU 12, thus being implemented as a module that performs functions shown in FIG. 2 or 3.

Terms such as "include", "constitute" or "have" described above may mean that the corresponding component may be inherent unless otherwise stated, and thus should be construed as further including other components rather than excluding other components. All terms including technical or scientific terms have the same meanings as those generally understood by those of ordinary skill in the art to which the embodiments disclosed herein pertain, unless defined otherwise. The terms used generally like terms defined in dictionaries should be interpreted as having meanings that are the same as the contextual meanings of the relevant technology and should not be interpreted as having ideal or excessively formal meanings unless they are clearly defined in the present document.

The above description is merely illustrative of the technical idea of the present disclosure, and various modifications and variations will be possible without departing from the essential characteristics of embodiments of the present disclosure by those of ordinary skill in the art to which the embodiments disclosed herein pertains. Therefore, the embodiments disclosed herein are intended for description rather than limitation of the technical spirit of the embodiments disclosed herein and the scope of the technical spirit of the present disclosure is not limited by these embodiments disclosed herein. The protection scope of the technical spirit disclosed herein should be interpreted by the following claims, and all technical spirits within the same range should be understood to be included in the range of the present document.

The invention claimed is:

1. A battery management apparatus, comprising:
    a microcontroller unit (MCU) configured to:
        identify whether a Modbus-communication connector is connected in a first identifying step;
        identify whether a controller area network (CAN)-communication connector is connected in a second identifying step; and
        configure a communication protocol based on identification results of the first identifying step and the second identifying step,
        wherein, when both the Modbus-communication connector and the CAN-communication connector are connected, the communication protocol is automatically configured based on the CAN-communication connector, and
        wherein, when the MCU determines that both the Modbus-communication connector and the CAN-communication connector are not connected, the MCU is configured to maintain the battery management apparatus in a standby state and check whether the Modbus-communication connector and the CAN-communication connector are connected at preset periods or in real-time.

2. The battery management apparatus of claim 1, wherein the MCU is configured to configure a Modbus-communication protocol when it is determined that the Modbus-communication connector is connected.

3. The battery management apparatus of claim 1, wherein the MCU is configured to configure a CAN-communication protocol when it is determined that the CAN-communication connector is connected.

4. The battery management apparatus of claim 1, wherein when the MCU determines that the CAN-communication connector is connected, an identifier (ID) is allocated in a daisy chain through CAN communication.

5. The battery management apparatus of claim 4, wherein when the MCU determines that the CAN-communication connector is not connected, the ID is allocated through Modbus-transmission control protocol (TCP).

6. The battery management apparatus of claim 5, wherein the MCU is configured to allocate the ID through the Modbus-transmission control protocol (TCP) using pre-stored command logic.

7. The battery management apparatus of claim 4, wherein the MCU allocates the ID after the battery management apparatus receives a wake-up signal through the CAN communication.

8. The battery management apparatus of claim 1, wherein the MCU is configured to determine that the Modbus-communication connector is connected based on whether power is supplied to an ethernet port.

9. The battery management apparatus of claim 1, wherein the MCU is configured to determine that the CAN-communication connector is connected based on whether power is received at a CAN port.

10. An operating method of a battery management apparatus, the operating method comprising:

a first identifying operation of identifying whether a Modbus-communication connector is connected;

a second identifying operation of identifying whether a controller area network (CAN)-communication connector is connected; and configuring a communication protocol based on identification results of the first identifying operation and the second identifying operation, wherein, when both the Modbus-communication connector and the CAN-communication connector are connected, the communication protocol is automatically configured based on the CAN-communication connector, and wherein, when both the Modbus-communication connector and the CAN-communication connector are not connected, the battery management apparatus is maintained in a standby state and a connection of the Modbus-communication connector and the CAN-communication connector are checked at preset periods or in real-time.

11. The operating method of claim 10, further comprising configuring a Modbus-communication protocol when the first identifying operation identifies that the Modbus-communication connector is connected.

12. The operating method of claim 10, further comprising configuring a CAN-communication protocol when the second identifying operation identifies that the CAN-communication connector is connected.

13. The operating method of claim 10, further comprising being allocated with an identifier (ID) in a daisy chain through CAN communication when the second identifying operation identifies that the CAN-communication connector is connected.

14. The operating method of claim 13, further comprising being allocated with the ID through Modbus-transmission control protocol (TCP) when the second identifying operation identifies that the CAN-communication connector is not connected.

* * * * *